United States Patent [19]
Scurlock

[11] 3,818,715
[45] June 25, 1974

[54] HEAT-INSULATING CONSTRUCTIONS
[75] Inventor: Ralph Geoffrey Scurlock, Southampton, England
[73] Assignee: National Research Development Corporation, London, England
[22] Filed: July 6, 1972
[21] Appl. No.: 269,292

[30] Foreign Application Priority Data
July 9, 1971    Great Britain.................... 32462/71

[52] U.S. Cl..................................... 62/45, 62/514
[51] Int. Cl........................................ F25b 19/00
[58] Field of Search................. 62/45, DIG. 13, 514

[56] References Cited
UNITED STATES PATENTS
2,396,459   3/1946   Dana..................................... 62/45
2,900,800   8/1959   Loveday................................ 62/45

OTHER PUBLICATIONS
Effective Thermal Insulation: Multilayer Systems by Peter E. Glaser, Published in Cryogenic Eng. News April 1969.

*Primary Examiner*—Meyer Perlin
*Attorney, Agent, or Firm*—Cushman, Darby & Cushman

[57] ABSTRACT

A heat-insulating construction, especially for use in low temperature vacuum vessels. The construction comprises material of high resistance to the flow of heat with which is mixed a substance exhibiting a strong cryopumping action. Carbon and alumina are typical such substances, which may be mixed in the construction by impregnation. If the construction is formed in thin layers the substance may be distributed by being applied to some or all of the layers, especially layers of low thermal conductivity.

3 Claims, 1 Drawing Figure

PATENTED JUN 25 1974  3,818,715
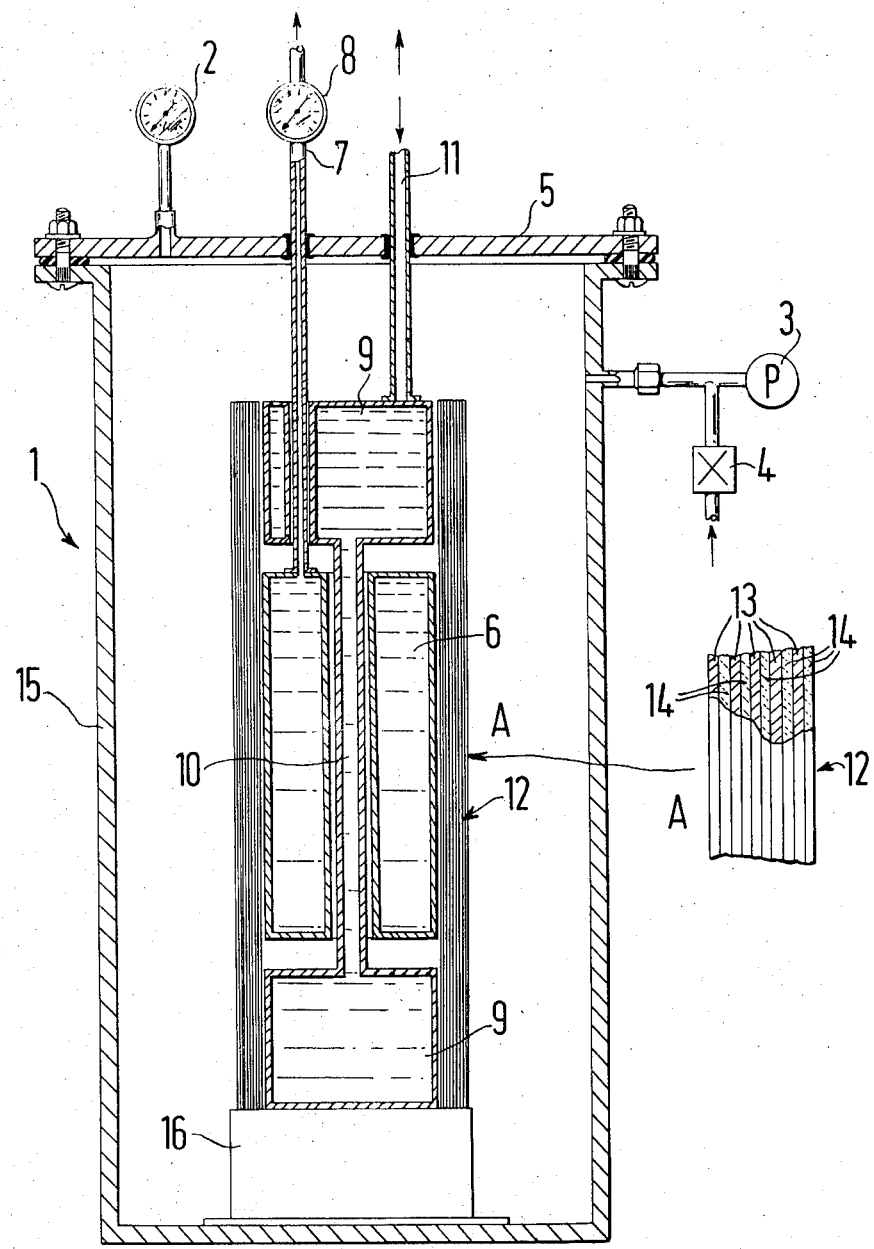

HEAT-INSULATING CONSTRUCTIONS

This invention relates to heat-insulating constructions. In particular it relates to such constructions which are intended to contain substances at very low temperatures under vacuum conditions. It thus relates, for example, to the insulating material that can be formed by expanding certain materials, for instance glass and some plastics substances such as polystyrene and polyurethane, under vacuum conditions to produce a rigid foam containing many enclosed cells. It has been shown that the thermal conductivity of such insulations depends greatly upon the degree of vacuum within such cells. It is also well known that while it is quite easy to create a vacuum of the required strength when forming the rigid foam, small leaks often quickly dilute the vacuum and raise the conductivity of the insulation above what is permissible.

The invention particularly relates to the very efficient heat-insulating storage vessels necessary in cryogenic applications. Many of the existing vessels of this type comprise a layered heat-insulating construction which surrounds the stored specimen and is itself contained at high vacuum inside a gas-tight metal envelope. The layered construction typically comprises alternate layers of a material that strongly impedes the flow of heat by radiation, for example aluminium foil or aluminised mylar sheet, and a material that strongly impedes the flow of heat by conduction, for example low filler glass fibre paper.

The conductivity of such a construction is very sensitive to the gas pressure within the envelope. For adequate performance, this must remain below about $10^{-4}$ Torr. To obtain this pressure, it has been found necessary in practice to bake such constructions at 50° to 100° C under high vacuum before enveloping them under the same conditions. Such baking can be a comparatively difficult and expensive process. Even if it is successfully achieved, small leaks which develop after the envelope is sealed may quickly raise the conductivity above what is permissible, and long-term desorption of gas from the surfaces of the layers or from the inner surface of the envelope may have the same effect. It is frequently impossible or impractical to re-bake the layered construction or otherwise regenerate such a vessel once it has failed. It is known to improve the initial conductivity of such vessels by placing within them a small descrete mass of a substance that exhibits a strong self-pumping action, but this improvement has not done away with the need to bake the layered construction initially, nor does it apparently counteract the fall that its insulation value suffers every time the vacuum within the vessel is diluted.

The invention is based upon the discovery that the performance of such vessels, and especially of the insulating constructions within them, may be improved by distributing the self-pumping substances in a new way. They should be in intimate contact with the materials of the construction itself. By this we mean at least that they should form a surface layer over the construction, and preferably that they should be distributed through the thickness of the construction, for instance by being impregnated in the materials or by being coated on many or each of the layers when the construction is layered. Preferably the substances have a strong cryo-pumping action as well as a relatively strong self-pumping action at temperatures nearer ambient; examples of such substances are carbon, silica gel and alimina. By "self-pumping" the present inventor refers to adsorbent material whose adsorbing property for water vapour, air and other gases and vapours is enhanced on cooling to a temperature below ambient.

The invention is defined by the claims and will now be described, by way of example, with reference to the accompanying diagrammatic drawing, which is a section through a conductivity cell.

The cell comprises a gas-tight casing 1 connected to a pressure-monitoring gauge 2, a vacuum pump 3 and an air admittance control 4. The interior of the casing can be reached by removing the demountable top flange 5. Within the casing, which the drawing shows in axial section, is a test cell 6. This cell is connected by a vertical conduit 7 to a flow meter 8. Guard cells 9, connected by a stem 10 which passes down the middle of cell 6, lie above and below the test cell. The top guard cell is connected to a vertical fill-and-vent tube 11. Test cell 6 and guard cells 9 are encased by an annular layered heat-insulating construction 12 comprising ten layers of insulation. As detail A shows, each layer comprises a sheet 13 of aluminium foil, and an adjacent sheet 14, basically of low-filler glass fibre paper. In tests, the results of which are given and discussed below, the guard cells 9 were kept full of liquid nitrogen and test cell 6 was initially filled with similar liquid. Evaporation of the liquid within the test cell was deduced by reading flow meter 8. The pressure within casing 1, which was assumed to be the same both outside and within the layered construction 12, was recorded on gauge 2; initially, this pressure was lowered to a value of $10^{-5}$ Torr. by pump 3. Small leaks in some of the tests were simulated by operation of control 4.

Parallel tests were first done on two apparatus which will be referred to as apparatus A and apparatus B. Apparatus A was just as already described, and therefore representative of known heat-insulating constructions. Apparatus B, which was according to the present invention, was as described except that the glass fibre paper of sheets 14 was loaded with carbon. In the apparatus just described, desorption of gas into the vacuum space is most likely to arise from metal sheets 13, and from the metal cylindrical wall 15 of casing 1. Construction 12 and cells 9 are supported off the floor of casing 1 by a low heat-transfer mounting of known type indicated at 16.

In one comparative test a considerable amount of air was leaked into the casing through control 4, and then both apparatus were vigorously vacuum-pumped overnight. In addition, the paper sheets 14 of apparatus A alone were baked at 60° to 70° C. Pumping and baking ceased simultaneously, and 2½ hours after apparatus A had cooled down a mean conductivity of about $1.3\mu$ W/cm degK was recorded across it. The corresponding value for apparatus B was about $0.70\mu$ W/cm degK. In a second test, the two apparatus were stored for several months at 1 atmosphere pressure, and were then vacuum-pumped for 24 hours. This time neither apparatus was baked. When pumping ceased, the mean conductivity across apparatus A was $3.0\mu$ W/cm degK, whilst it was about $1.7\mu$ W/cm degK across apparatus B. Immediately after this test ended, 2 c.c. of air were added through control 14 to the interior of each casing, and mean conductivity readings were taken at daily intervals, The mean conductivity across apparatus B was about $10\mu$ W/cm degK after one day, and improved steadily until it was about $1.2\mu$ W/cm degK after 22 days. Apparatus A, on the other hand, recorded a mean conductivity of almost $12\mu$ W/cm degK after one day, and this figure remained constant thereafter. It was found generally that the thermal conductivity of construction 12 of apparatus B was 30 percent lower than that of the same part in apparatus A, which was identical except for the addition of carbon. The tests already quoted show the marked superiority of the loaded paper in recovering acceptable performance after injection of simulated air leaks, and of similar recovery after prolonged exposure to atmosphere. In this case the layered member of apparatus A required baking as well. The tests also show that after brief exposure to relatively high pressure, overnight pumping restored the insulation of apparatus B but apparatus A again required baking as well. It was also apparent that apparatus B was capable of absorbing considerable air leakage even when subject to cold/warm cycles, indeed that a warm period after use appeared to give improved performance during the next cold run; this was not so with apparatus A.

In another test two apparatus C and D were tested. Both were constructed from materials taken fresh from store. Apparatus C was similar to apparatus A, construction 12 being of the known kind comprising alternate layers of "Mylar" film, aluminised on both sides and glass fibre paper. Construction 12 of apparatus D comprised alternate layers of similar "Mylar" film and a wood pulp paper loaded with a mixture of carbon and 10 percent alumina. Neither apparatus was baked in any way before being evacuated. The initial conductivity of apparatus C was the same whether or not a quantity of a substance having a self-pumping action (20 grams of activated charcoal, vacuum baked at 300° C for 24 hours previously) had been introduced to the cell. This carbon was introduced in a small copper pot, cooled in contact with cells 9. In both these cases the apparatus recorded an initial thermal conductivity of $0.75\mu$ W/cm degK. Apparatus D, on the other hand, recorded a corresponding conductivity of only about $0.37\mu$ W/cm degK, and only little more after being left over a weekend while gas was able to enter the vacuum space through a small leak. Such a conductivity is acceptably low for many practical purposes, and it would appear to be lower than anything that can be achieved using known insulating constructions without baking. Lower conductivities can be achieved from both the old and the new insulations by baking them, but the known insulations appear to suffer cumulatively from exposure to vacuum leaks and to have no power of recovery even when a self-pumping substance is separately present within the cell, while insulating constructions according to the present invention do seem to have such power as the second test with apparatus B showed.

In foamed insulations, it will be appreciated that by distributing the self-pumping substance within the mix prior to foaming, the substance should be distributed evenly within the product and thus within the vital wall surfaces of the enclosed cells, through which clearly gases must penetrate if the vacuum within those cells is to be diluted. There are also advantages in distributing the self-pumping substances so that they closely confront those surfaces of the vessel or its components through which gas is most likely to leak or from which it is most likely to be desorbed. In the apparatus shown in the drawing leaks and desorption are most likely from walls 15 and layers 13 respectively; the carbon, being distributed in the cylindrically arranged sheets 14, confronts both of these surfaces.

I claim:

1. In a low temperature vessel for use within an evacuated, substantially gas-tight envelope, which vessel includes a storage container peripherally surrounded by a jacket of thermal insulating material, the improvement wherein:

the jacket further includes an adsorbent material whose adsorbing property for water vapour and air is enhanced on cooling to a temperature below ambient material in intimate contact with the thermal insulating material and being at least distributed over the outer surface of the jacket;

the thermal insulating material being made of plural, alternate peripheral wraps of a first sheet material that strongly impedes the flow of heat by radiation and of a second sheet material that strongly impedes the flow of heat by conduction, and wherein the adsorbent material is present as a filling of the second sheet material.

2. The article of claim 1, wherein the second sheet material is glass fibre paper.

3. The article of claim 1, wherein the first sheet material is constituted by at least one member of the group: polyester film aluminized on both sides thereof and aluminum foil; wherein the second sheet material is constituted by at least one member of the group: glass fibre paper, and a rigid foam containing many closed cells made of one of expanded glass, polystyrene and polyurethane; and wherein the adsorbent material consists of at least one substance chosen from the group: carbon, silica gel and alumina.

* * * * *